April 15, 1969   R. J. REMEK   3,438,311
HIGHWAY MARKER
Filed June 14, 1967

INVENTOR
RUDOLPH J. REMEK

BY Charles L. Lonsdale
ATTORNEY

United States Patent Office 3,438,311
Patented Apr. 15, 1969

3,438,311
HIGHWAY MARKER
Rudolph J. Remek, Fairview, Pa., assignor to Continental Rubber Works, Erie, Pa., a corporation of Pennsylvania
Filed June 14, 1967, Ser. No. 646,024
Int. Cl. E01f 9/01, 9/10; E01c 23/16
U.S. Cl. 94—1.5                                                  6 Claims

ABSTRACT OF THE DISCLOSURE

The marker disclosed herein has a torsional unit made of flexible material such as synthetic rubber or the like or some other suitable material. This torsional unit is assembled under tension into a prepared casing. Tension is applied by means of adjusting nuts while the casing is secured and can be deflected in any direction. This torsional unit can be used to support markers on the highway or various signals. It can be bolted or secured to a peg in the ground. The casing can be bolted to a marker post so that when snowplows or trucks or cars bump into the post, its flexibility allows the post to move in an opposite direction. The resiliency of the rubber forces the post to return to its original erect position when the force is removed, thus preventing damage to the post.

---

This invention relates to highway markers and, more particularly to highway markers in combination with flexible swivel bases.

It is, accordingly, an object of the invention to provide an improved support for a highway marker and the like.

Another object of the invention is to provide a torsional coupling member in combination with a signal member for highways.

Another object of the invention is to provide a highway marker support which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
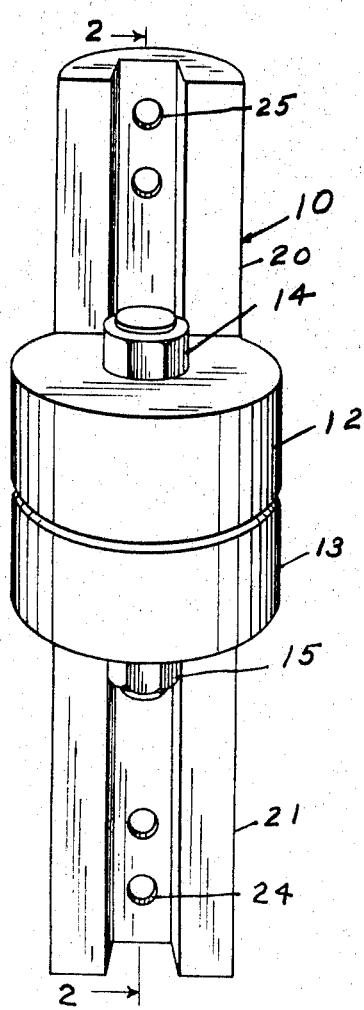
FIG. 1 is a side view of a bracket according to the invention.
Figure 2:
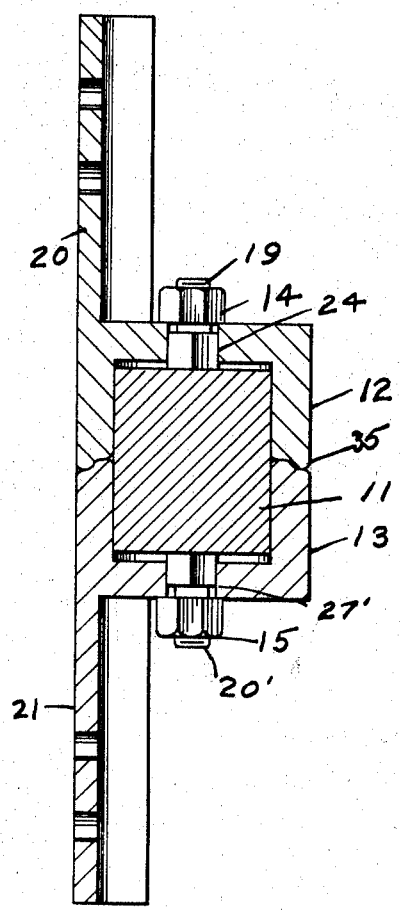
FIG. 2 is a cross-sectional view taken on line 2—2 of FIG. 1.

Now with more particular reference to the drawings, the coupling for the marker support has the body 11 which may be made of synthetic rubber or a material having properties of resiliency and rigidity like rubber and having the threaded members 20 and 21 bonded into the body 11. The torsional members may be in the form of square bolts 19 and 20' which are received in square holes 24 and 25 in the casings 12 and 13. The adjusting nuts 14 and 15 may be threaded on the bolts to apply a tension to the body 11 so that a force exerted between the members 12 and 13 will result in a tensile force on the rubber. Casing 12 is a cuplike member that has a rim 35 that overlies the sides of the casing 13 thereby positively locating them in aligned position. Portions 24 and 27' of the square bolts 20 and 21 prevent the upper part 12 from rotating relative to the lower part 13.

The upper and lower parts have flat surfaces 20 and 21 to which the signal member 17, having a flag 18 attached to it, may be fastened by means of the bolts 22 and 23.

The peg 16 or post may be driven into the ground or it could be in the form of a suitable bracket attached to a pavement and attached to the lower casing 13 by means of bolts 23.

Figure 3:
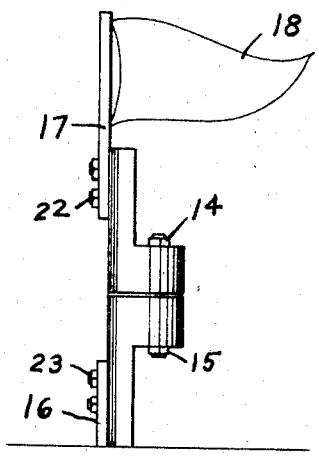
FIG. 3 is a side view of the bracket shown with a signal device thereon.

When device is in use, it will be supported as shown in FIG. 3 with a signal member flag 18 attached to the top. Then when a truck or snow plow hits the device, it will bend the top part 12, 20 and 17 over relative to the lower part. This will stretch the body 11 and exert a tensile force on it. When the snow plow passes, the resiliency of the body 11 will pull the bracket back to the position shown in FIG. 3. Thus, the sign or signal will be unharmed. The rigidity of the device may be controlled by tightening the bolts.

The embodiments of the invention in which an exclusive property or privilege is claimed are defined as follows:

1. A marker support comprising an upper casing and a lower casing,
    means on said upper casing for attaching it to a signal member,
    means on said lower casing to attach it to a ground anchoring member,
    a solid resilient member,
    means fixing said resilient member to said upper casing and to said lower casing whereby said upper casing may be moved relative to said lower casing member,
    said upper casing has a concave portion facing said lower casing receiving a part of said resilient member,
    said lower casing having a convex portion facing said upper casing and receiving another part of said resilient member,
    and said anchoring member comprises threaded bolts and molded in a piece of synthetic rubber.

2. The support recited in claim 1 wherein said concave portions comprise generally cylindrical cavities and said bolts are disposed generally parallel to the central axis of said cavities and said resilient member is spaced from the bottom of said cavities,
    and means is provided to exert a tension on said resilient member urging it toward the bottom of said cavities and urging said upper casing and said lower casing into alignment wth each other.

3. The support recited in claim 2 wherein a signal is attached to said upper casing member and a ground support member is fixed to said lower casing member.

4. The marker support recited in claim 2 wherein said resilient body has a first and a second threaded member molded in it and extending from opposite sides thereof, said first threaded member extending through an opening in said upper casing and being fixed thereto,
    and second threaded member extending through said lower concave member and being fixed thereto.

5. The marker support recited in claim 4 wherein a signal member is attached to said upper casing,
    and a ground engaging member is fixed to said lower casing member.

6. The support recited in claim 5 wherein said upper rim has an outer peripheral member overlying said lower concave member and extending around it whereby said upper and lower casings are held in alignment when in normal position.

References Cited

UNITED STATES PATENTS

| 1,903,869 | 4/1933 | Meister | 94—1.5 X |
| 2,141,067 | 12/1938 | Miller | 94—1.5 X |
| 2,949,324 | 8/1960 | Birge | 94—1.5 X |
| 3,349,531 | 10/1967 | Watson | 94—1.5 X |
| 3,355,998 | 12/1967 | Roemisch | 94—1.5 |

NILE C. BYERS, JR., *Primary Examiner.*